June 7, 1949.  H. L. McCLEERY ET AL  2,472,258
TRAFFIC ANALYZER
Filed Jan. 9, 1942  3 Sheets-Sheet 1
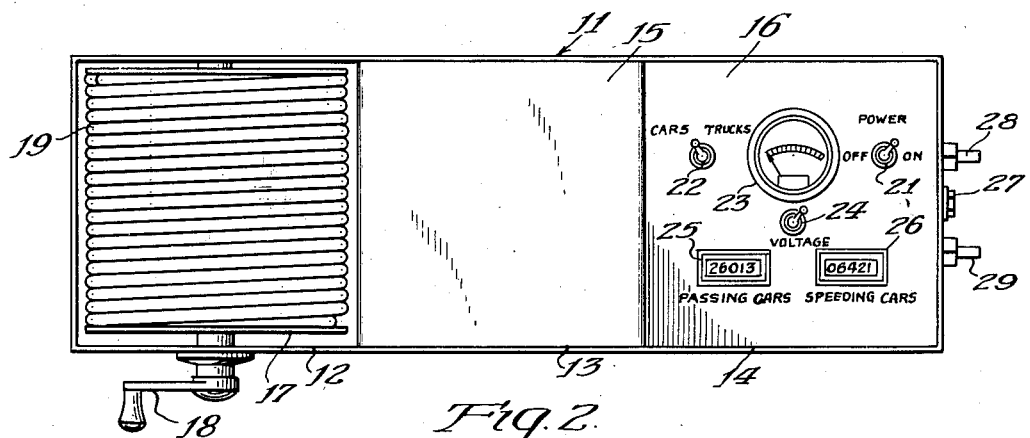
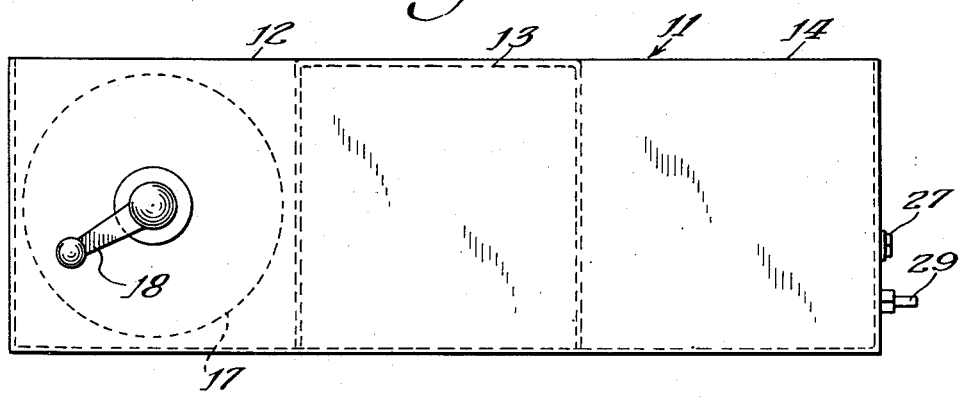
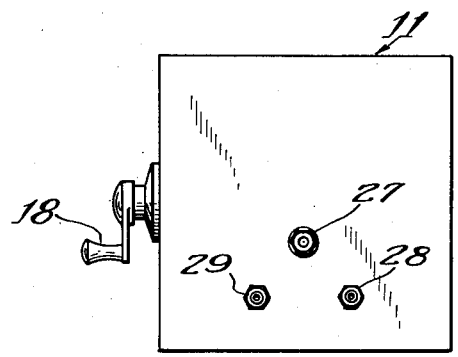
Inventors:
Harold L. McCleery,
Carlyle B. Stair
By: [signature]
Attorney

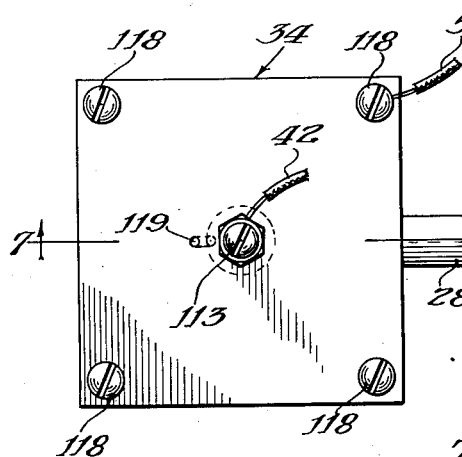
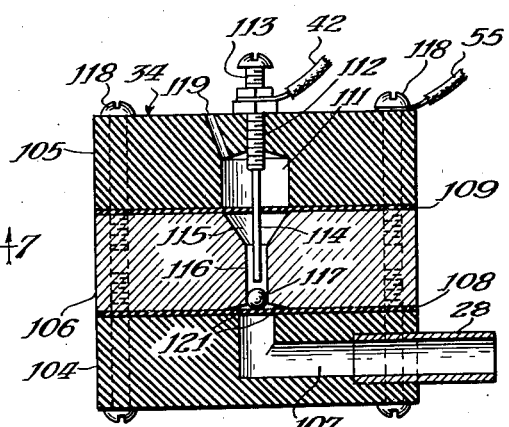
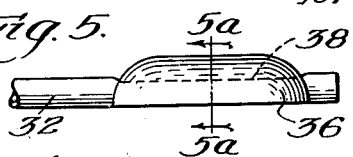
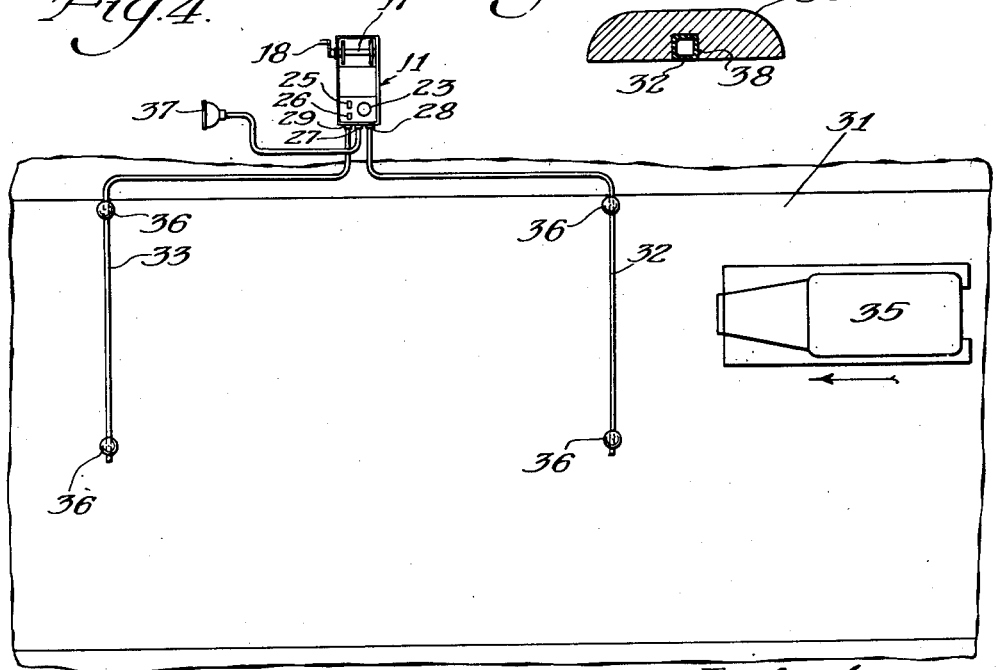

June 7, 1949. H. L. McCLEERY ET AL 2,472,258
TRAFFIC ANALYZER
Filed Jan. 9, 1942 3 Sheets-Sheet 3
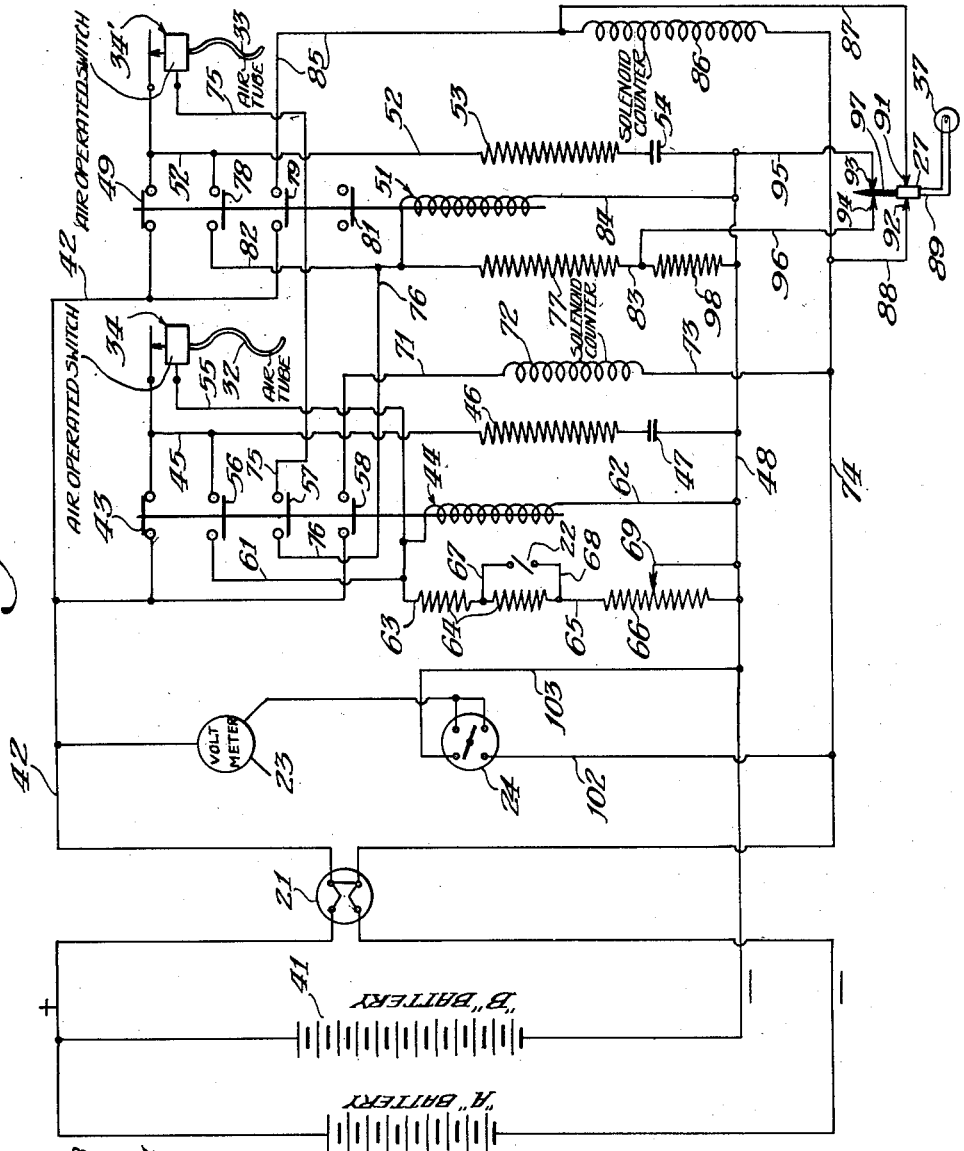
Fig. 8.
Fig. 9.
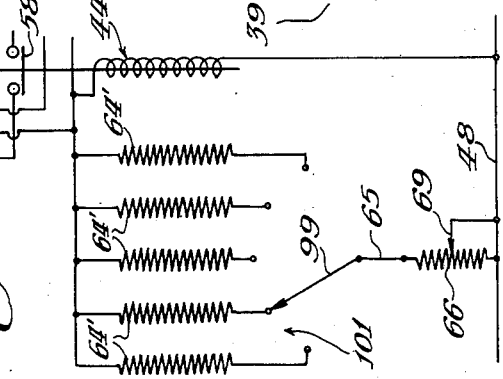
Inventors:
Harold L. McCleery,
Carlyle B. Stair.
By: Carl S. Lloyd
Attorney.

Patented June 7, 1949

2,472,258

UNITED STATES PATENT OFFICE 2,472,258

TRAFFIC ANALYZER

Harold L. McCleery and Carlyle B. Stair, Downers Grove, Ill.; said McCleery assignor to said Stair Application January 9, 1942, Serial No. 426,146

11 Claims. (Cl. 235—92)

This invention relates to means for analyzing traffic conditions at any given location on a road or street and, if desired, for aiding in the enforcement of speed regulations.

One of the objects of the invention is to provide an improved device for counting the number of cars passing a given point in one direction within the period of time that the device is in the given location or the period between inspections and resetting of a counter indicator which forms a part of the device.

Another object is to provide a device of this type which will automatically count and record the number of such cars which are exceeding a predetermined rate of speed. A related object is the provision of a device which can be readily adjusted to adapt it for different speeds.

A further object is to provide in such a device means for giving a visual or audible signal to an officer stationed some distance away indicating that a car passing the device is exceeding the speed for which the device is set.

Other objects are to provide a device of the character described which can be used either for merely counting passing cars or for also detecting the speeding cars, with or without use of the signaling device; to provide means whereby the device may be set either for counting ordinary passenger cars or for counting long trailer-trucks (which present a somewhat different problem); and to provide a device for the purpose stated which is portable and easily set up for operation, as well as being relatively inexpensive to manufacture and economical to operate.

Other objects and features of the invention will appear from the following specification and drawings, in which:

Fig. 1 is a top plan view of a portable apparatus containing the device of our invention;

Figs. 2 and 3 are side and end elevations, respectively, of the apparatus showing the exterior of the case in which the mechanism is contained;

Fig. 4 is a diagrammatic view showing the device installed on one side of a street, showing also an approaching car;

Figs. 5 and 5a are detailed views showing the construction of the weights by which the tubes which extend into the street are held in place;

Fig. 6 is a top plan view of an air-operated switch of a type which may be employed to close the electrical circuits as a result of the passing of the wheels of a car over the tubing positioned in the street;

Fig. 7 is a cross-sectional view of said switch;

Fig. 8 is a diagrammatic view of the electrical elements and circuits employed in the device; and Fig. 9 is a diagrammatic view showing a tap changer and calibrating resistance which may be used in connection with one of the timing condensers of the device in a modification of the arrangement shown in Fig. 8.

The device as shown in Figs. 1 to 3, inclusive, comprises a casing, identified by the reference numeral 11, said casing being divided into three compartments identified by the numerals 12, 13 and 14, respectively, the compartments 13 and 14 having cover plates 15 and 16, respectively, at the top thereof, and the compartment 12, as shown, being open. The latter compartment contains a reel 17 having a crank handle 18 thereon, the latter being positioned on the exterior of the casing, said reel being for the purpose of winding up tubes of rubber or like flexible material (to be later described) by which impulses from passing cars are transmitted to the device to cause operation of the electrical elements, the tubing being generally indicated in Fig. 1 by the reference numeral 19.

The compartment 13 houses "A" and "B" batteries and also provides space for carrying tools as well as weights and connectors for the tubes, the purpose and construction of which will later appear.

The compartment 14 contains electrical apparatus which will be hereinafter described in detail, and the cover 16 is in the form of an etched plate on which there are mounted two switches identified by the numerals 21 and 22, a voltmeter 23 and associated switch 24, and two counters 25 and 26, all of which devices will be further described in connection with the description of the apparatus housed in said compartment 14.

Protruding from the end of the casing in which said compartment 14 is located are a lamp jack 27 and two tube connectors 28 and 29, the purpose of which will also later appear.

Referring now to Fig. 4, the device of our invention is shown installed at one side of a street 31, with two tubes 32 and 33 of rubber or other suitable flexible material extending into the street, said tubes being connected by said connectors 28 and 29 with air-operated switch devices positioned in the compartment 14 in the casing 11, one of said devices being shown in Figs. 6 and 7 and being generally identified by the reference numeral 34. The end portions of the tubes 32 and 33 are placed in the street, extending past the middle thereof so as to be in the path of all cars travelling in one direction, one of such cars being indicated by the numeral 35. Said tubes are each held in place by means of weights 36, one of which is positioned adjacent the curb and the other past the center of the street. As will later appear, the spacing of the tubes may be utilized as a means for adapting the device to different car speeds, so that at times it may be used for detecting cars going at or in excess of one speed and at other times for registering the cars going at or in excess of another speed.

The lamp 37 is shown connected to the lamp jack 27 and may be positioned at a convenient point so that it may be observed by an officer some distance down the street when the device is used as an aid to traffic enforcement.

The construction of the weights 36 is shown in detail in Fig. 5, from which it will appear that they are semi-oval shaped, with a flat bottom side and with a channel 38 extending therethrough for reception of one of the tubes 32 or 33. The cross-dimension of the channel or slot 38 is slightly less than the outside diameter of the tube so that when the latter is stretched through the slot, the subsequent expansion thereof against the walls of the slot is sufficient to hold the weight firmly on the tube. This slight compression on the tube also causes the material thereof to extend slightly beyond the flat surface of the weight so as to increase the coefficient of friction of the weight on the pavement. The oval corners on the upper surface of the weights make it possible for the wheels of cars to pass over them without any tendency to slide them and the tube together on the pavement, or to in any way throw the weights out of position. Furthermore the use of portable weights of this character makes it possible to fasten down both ends of the tubes and to put them in place or remove them quickly. This arrangement also facilitates the laying of the tubes only halfway across the street for making directional checks of traffic. With other constructions it has been customary either to run the tubes entirely across the pavement and anchor the ends mechanically to the curbs or to secure the outer end in the middle of the street by means of hardened pins driven into the cracks or crevices of the brick or concrete paving. The weights of the type which we employ, with the means of fastening them to the tubes causing portions of the tubes to protrude so as to increase the coefficient of friction between the weights and the pavement, constitute a very definite improvement over all prior anchoring arrangements with which we are familiar.

For an understanding of the electrical mechanism and circuits employed attention is now directed to Fig. 8, in which said mechanism and circuits are diagrammatically shown in their relation to the tubes 32 and 33 and air switches 34 and 34', by means of which the device is actuated by passing cars.

As a source of power we have shown an "A" battery identified by the numeral 39 and a "B" battery indicated by the numeral 41. Said batteries are connected by means of the switch 21, which, as shown, is a double switch, with the circuits for supplying the power to operate the various electrical elements which perform the several functions of the device, as will appear from the following description. When said switch is closed, the current will flow through a conductor 42 to a contact 43 of a relay generally indicated at 44. From said contact 43 the current flows through a wire 45 to a resistance 46 and a timing condenser 47, thence to a wire 48 leading back to the "B" battery.

In like manner current will flow from the conductor 42 through a contact 49 of a second relay 51 and from said contact to a wire 52 leading to a charging resistance 53 and a second timing condenser 54, thence to the wire 48 and back to the "B" battery.

With both condensers 47 and 54 thus charged, when the front wheels of a car pass over the tube 32, the air-operated switch 34 will be closed and current will momentarily flow from the line 42 through the contact 43 of relay 44 and through the contacts of said air switch 34 to a wire 55, leading to relay 44, the coil of which is thereby energized with the result that contact 43 will be opened and contacts 56, 57 and 58 of the relay will be closed.

The opening of the contact 43 disconnects the source of power from the charged condenser 47 and the closing of the contact 56 short-circuits the air switch 34, thus providing a holding circuit from said condenser so that current may flow from the condenser through the resistance 46, the wire 45, the contact 56, and a wire 61, back to the coil of the relay 44, thence to a wire 62 connecting said coil with the wire 48 leading back to the condenser 47.

A part of the current from the condenser also passes from the wire 61 through a wire 63 to a calibrating resistance 64, thence by a connector 65 to a temperature compensating resistance 66 and through the wire 48 back to the condenser 47.

The resistors 64 and 66 in series are in parallel with the coil of the relay 44, and thus the timing of the discharge of the condenser is controlled by the combined resistance of the relay and the resistors 64 and 66, it being understood that the more resistance included in the circuit the longer the time of discharge of the condenser will be.

Provision is made for increasing the time of discharge when the traffic involves a mixture of long trailer-trucks with passenger cars, this being accomplished by means of the switch 22 and suitable connections 67 and 68. To adapt the device for passenger cars only, the switch 22 may be closed, thus short-circuiting a part of the resistance 64, and to adapt it for trucks or a combination of passenger cars and trucks, the switch may be left open, thus inserting the additional resistance and increasing the time of discharge of the condenser 47. Further reference will be made to this feature of the invention at a later point in this specification.

The resistor 66 is in the form of a rheostat, the arm of which is diagrammatically indicated at 69, and the calibration may therefore be changed to conform to temperature changes, which is desirable for the sake of accuracy. The arrangement is such that the value of the resistance 66 may be varied by setting the rheostat to conform to a thermometer reading, and for this purpose a dial (not shown) may be provided and calibrated in degrees Fahrenheit so that correction for the timing in accordance with temperature conditions may be readily made by operation of the dial.

Upon disconnection of the condenser from the source of power by the opening of the contact 43, as above described, the condenser voltage begins to fall, and when it falls to the predetermined point for which the device is set, the relay opens up, opening the contacts 56, 57 and 58 and closing the contact 43. Meantime, upon the closing of the contact 58 current will have passed therethrough and through a lead 71 to a coil 72 of the solenoid counter 25, which is, in turn, connected by a wire 73 to a return wire 74 leading through the switch 21 and back to the "A" battery 39. The counter coil 72 and counter 25 thus serve to count all passing cars, being operated by the passing of the front wheels of a car over the tube 32, which, as above stated, causes energization of the relay coil and the consequent closing of said contact 58, as well as the contacts 56 and 57.

The contact 57 is interposed between a wire 75, leading from the air-operated switch 34', and a wire 76 connected to the coil of the relay 51. Therefore, if while the relay 44 remains energized and the contact 57 consequently closed, the front wheels of the car pass over the tube 33, thereby closing the air-operated switch 34', current will flow from the conductor 42, through contact 49 of relay 51 to wire 52 and through the switch 34', the wire 75, the contact 57, and the wire 76 to the relay coil 51, as well as to a calibrating resistance 77 associated with the coil of said relay. Said relay 51 will thereupon be energized, with the result that the contact 49 will be opened and contacts 78, 79 and 81, which are also actuated by said relay, will be closed.

The opening of the contact 49 disconnects the power source from relay 51 and calibrating resistance 77, but the closing of the contact 78 provides a circuit from the condenser 54 so that its charge passes through the resistance 53, the wire 52, the contact 78, and a wire 82 to the resistance 77 and the coil of the relay 51, thence through leads 83 and 84, respectively, to the wire 48 and back to the condenser 54.

The closing of the contact 79 allows current to pass from the conductor 42, through said contact 79, and a wire 85 to a coil 86 of the solenoid counter 26, which is employed for counting speeding cars. Said counter coil 86, like the counter coil 72, is connected to the minus wire 74 of the "A" battery.

The lamp jack 27 is connected to wire 85 by means of a wire 87 and to said wire 74 by a wire 88. The lamp or bull's-eye 37 is adapted to be plugged into said jack by means of a plug 89 adapted to make the proper contact with normally open contacts 91 and 92 of the jack. The lamp is thus illuminated when the relay 51 is energized and remains on until the condenser 54 has discharged to the point that said relay 51 is deenergized and the contact 79 consequently opened.

In order to increase the time of discharge of said condenser 54 when the light is plugged in, we provide normally closed contacts 93 and 94, connected, respectively, with wires 95 and 96, and form the plug 89 with an insulated extension 97 adapted to separate said contacts when the plug is inserted in the jack. The wire 95 is connected to the wire 48 leading to the condenser 54 and the wire 96 to the wire 83, and an additional calibrating resistance 98 is provided between the point of connection of said wires 96 and 83 and the wire 48. Separating said contacts 93 and 94 inserts said resistance 98 in series with the resistance 77, thus increasing the total resistance in the circuit in parallel with the coil of the relay 51, which has the effect of decreasing the rate of discharge of the condenser 54, thus increasing the time that said relay 51 remains closed, so that the light will remain on for a length of time calculated to be the right length for observation by the officer without interfering with the operation of the device by oncoming cars.

When it is desired to use the device merely for counting passing cars, for the purpose of analyzing traffic conditions, the light will not be used, and, since the contacts 93 and 94 will then remain closed, the resistance 98 will be short-circuited, so that the relay 51 consequently will remain energized for a much shorter time, its function then being merely to operate the counter 26 by means of the coil 86.

It will now be evident that if the first relay 44, which is energized as a result of the front wheels of a car passing over the tube 32, has been deenergized by reason of the discharge of the condenser 47 before said wheels pass over the tube 33, the impulse from the latter tube will have no effect since the circuit to the second air switch 34' will have been opened by the opening of the contact 57 of said relay 44. The time of discharge of said condenser and the distance apart of the tubes 32 and 33 can thus be so related that cars going faster than a certain rate of speed will strike the second tube 33 before the condenser 47 has discharged to the point that the relay 44 is deenergized and this will cause energization of the second relay 51, and operation of the counter 26 and, if desired, also the light 37, whereas if the car is going slower than said predetermined speed the first condenser will have timed out before the car wheels reach the second tube, so that said counter 26 and light 37 will not be operated by such a car.

With the arrangement shown in Fig. 8 the device is set up for checking different car speeds by varying the distance between the tubes 32 and 33, with a fixed timing of the relay 44, which, of course, can be calibrated for any particular time desired by selection of proper calibrating resistance 64. The latter resistance as shown in said Fig. 8 is constant except that it may be altered by means of the switch 22 so as to include more resistance when the device is set for checking trucks than when it is set for merely checking passenger cars. If the relay, for example, is calibrated for ½ second, i. e., so that the condenser 47 will be discharged and the relay coil consequently deenergized in that length of time, the tubes may be placed 25.64 feet apart for checking cars going at the rate of 35 miles per hour and at greater distances apart for checking cars going at higher speeds. The timing would be substantially longer for checking trucks and the tubes would therefore be spread further apart than for cars, since to avoid errors, it has been found desirable to have the distance between the tubes great enough so that the rear wheels of a long trailer will pass over the first tube before the front wheels reach the second tube. As above indicated, the timing is increased to correspond to this greater distance apart of the tubes by leaving the switch 22 open and thus including all the calibrating resistance 64 in parallel with the coil of the relay 44.

As an alternative means of varying the timing of the device, we have shown in Fig. 9 a tap changer comprising a series of resistors 64' and an adjustable contact arm 99 movable over a face plate 101 so as to include in the circuit in parallel with the relay 44 a desired number of the resistors 64' for a particular speed setting. In this case the tubes 32, 33, would be left a fixed distance apart and the adjustment for different speeds would be accomplished by positioning the arm 99 so as to include more or less of the resistance 64' as may be required for a particular setting.

It may be noted at this point that the voltmeter 23 is positioned between the positive wire 42 on one side and the negative wires 48 and 74 on the other, and that the switch 24 is a three-position switch which is normally in center position with all of the contacts open and may be turned in one direction to obtain a reading of the condition of the "A" battery and in the other direction to obtain a reading of the "B" battery, as will be understood from inspection of Fig. 8, in which the leads from the switch to the "A" and "B" batteries are indicated, respectively, by the reference numerals 102 and 103. The voltmeter switch should normally be left in the center position so as to avoid an undue drain on the batteries.

The construction of a suitable form of the air switches 34 and 34' is illustrated in Figs. 6 and 7 of the drawings, to which attention is now directed. In these views a single switch is shown since the switches 34 and 34' may be of identical construction. The switch comprises two blocks of insulating material, 104 and 105, with an iron block 106 sandwiched between them. The block 104 has a passage 107 therein communicating with the connector 28 by means of which the switch is connected to the rubber tube 32. A rubber diaphragm 108 is provided between the block 104 and the block 106, and a similar diaphragm 109 is preferably provided between the blocks 106 and 105. The block 105 has an expansion chamber 111 drilled part-way through the same from the bottom, with a threaded hole 112 at the center, opening into said chamber, and an adjustable screw contact member 113 extends through said hole, said contact being connected with the conductor 42. Said contact member has a slender extension or pin 114 thereon extending through the diaphragm 109 and into a drilled hole 115 in the block 106, said hole tapering to a relatively narrow lower portion 116 into which the end of said extension 114 projects.

The other contact of the switch is in the form of a mercury ball 117 located in the opening 116 and resting upon the rubber diaphragm 108, said mercury ball and said opening 116 being of such relative size that the mercury ball is constantly in contact with the iron block 106.

The blocks are held together by means of screws 118 which are threaded into the iron block 106 and one of such screws serves as a conductor connecting with the wire 55 leading from the switch 34 to the relay 44 and calibrating resistance 64, as shown in Fig. 8. A venthole 119 is preferably provided in the block 105, providing communication between the chamber 111 and the outside atmosphere.

It will now be evident that an impulse transmitted from the rubber tube 32 through the connector 28 and passage 107 will cause upward movement of the diaphragm 108 at the center, clearance for this purpose being provided by cutting away the lower side of the block 106 as indicated at 121, and the mercury ball 117 will thus be caused to move upwardly into contact with the extension or pin 114 on the contact member 113. The switch will thus be closed, with the result previously described. The diaphragm 109 serves to prevent the mercury ball from escaping from the device through the venthole 119 in the event the switch should be turned upside down. The expansion chamber 111 prevents undue back pressure from being set up on the top side of the mercury ball, which would prevent the switch from operating, and the air vent 119 facilitates relieving such pressure, thus providing a high degree of sensitivity of the switch.

It will be understood that the form of the air or fluid-operated switch might be varied and that we do not restrict ourselves to the particular form shown. However, the device illustrated in said Figs. 6 and 7 is well suited to the requirements of the system of our invention.

The operation of the device it is believed will be evident from the foregoing description. When the front wheels of a car cross over the tube 32, the first relay 44 will be energized and will remain so for a predetermined time determined by the time required for discharge of the charged condenser 47. If the relay has been deenergized before the wheels of the car strike the second tube 33, the impulse from the latter will be of no effect and the only result of the operation of the relay 44 will have been to cause operation of the counter 25 by means of the coil 72. If, however, the relay 44 has not been deenergized by the time the front wheels of the car strike the tube 33, the closing of the second air-operated switch 34' will cause energization of the relay 51 and consequent operation of the second counter 26 by means of the coil 86; and if the lamp 37 has been plugged into the lamp jack 27, will also cause illumination of said lamp for a predetermined time determined by the time required for discharge of the second charged condenser 54.

The foregoing detailed description has been given for clearness of understanding only, and no unnecessary limitations should be understood therefrom, but the appended claims should be construed as broadly as permissible in view of the prior art.

We claim:

1. A traffic analyzing device comprising impulse members arrangeable in spaced relationship in the direction of traffic in a traffic lane on a street, switches actuated by impulses transmitted by said members as a result of cars passing over the same, a source of electrical power, a switch for turning said power on or off, a timing condenser arranged in series with said source of power and said on-and-off switch and being therefore chargeable from said source of power when said on-and-off switch is closed, a relay having a coil arranged in series with said source of power and the first of said impulse-actuated switches so as to be initially energized upon the closing of such switch by a car passing over the first of said impulse members, a plurality of contacts arranged to be actuated by said relay coil, one of said contacts being normally in circuit with said source of power and with said condenser and being arranged to be opened by said relay coil upon energization thereof to disconnect said condenser from said source of power, a second of said contacts being arranged to be closed by the initial energization of said relay coil and to thereby establish a circuit between said condenser and said relay coil to keep the latter energized from a pre-determined time after disconnection thereof from said source of power, a calibrating resistance in series with said condenser and in parallel with said relay coil to control the time required for discharge of the condenser, a car counter actuating coil, means, including a third one of said contacts, for energizing said car counter coil when said third contact is closed by energization of said relay coil, a speeding car counter actuating coil, and means, including a fourth one of said contacts and a second one of said impulse-actuated switches, for actuating said speeding car counter coil when said second impulse-actuated switch is closed by the passing of the wheels of the car over the second impulse member provided said fourth contact has not by that time been opened as a result of de-energization of said relay coil due to discharge of said condenser.

2. In combination with the structure set forth in claim 1, a signal device, and means controlled by the relay coil for operating said signal device when a car passes over the second impulse member while said relay coil remains energized.

3. A traffic analyzing device comprising two impulse members arrangeable in spaced relationship in the direction of traffic in a traffic lane on a street, switches actuated by impulses transmitted by said members as a result of cars passing over the same, a source of electrical power, a switch for turning said power on or off, a timing condenser arranged in series with said source of power and said on-and-off switch and being therefore chargeable from said source of power when said on-and-off switch is closed, a relay having a coil arranged in series with said source of power and the first of said impulse-actuated switches so as to be initially energized by the closing of such switch by the passing a car over the first of said impulse members, a plurality of contacts actuated by said relay, one of said contacts being normally in circuit with said source of power and with said condenser and being arranged to be opened by said relay coil upon energization thereof to disconnect said condenser from said source of power, a second of said contacts being arranged to be closed by the initial energization of said relay coil and to thereby establish a circuit between said condenser and said relay coil to keep the latter energized for a predetermined time after disconnection thereof from said source of power, a calibrating resistance in series with said condenser and in parallel with said relay coil to control the time required for discharge of the condenser, a car counter actuating coil, means, including a third one of said contacts, for energizing said car counter actuating coil when said third contact is closed by energization of said relay coil, a second timing condenser arranged in series with said source of power and said on-and-off switch and being therefore chargeable from said source of power, a second relay having a coil in series with a fourth one of the contacts of said first-mentioned relay coil and arranged to be initially energized by the closing of the second of said impulse actuated switches when the wheels of the car pass over the second of said impulse members while said first-mentioned relay remains energized and to be kept energized for a predetermined time by current supplied by said second condenser, a plurality of contacts actuated by said second relay coil, a speeding car counter actuating coil, and means, including one of the contacts of the second relay, for energizing said speeding car counter actuating coil when said second impulse actuated switch is closed by the passing of the wheels of the car over said second impulse member provided said first relay coil has not been at that time deenergized by reason of the time elapsed between contact of the wheels of the car with said first and second impulse members, respectively.

4. In combination with the structure set forth in claim 3, a signal device, and means, including a contact of the second relay, for causing operation of said signal device when a car passes over the second impulse member within a predetermined time after passing over the first member.

5. A structure as set forth in claim 1 in which the calibrating resistance includes an adjustable element whereby the amount of resistance in the circuit may be varied to compensate for different temperature conditions.

6. In combination with the structure set forth in claim 3, a calibrating resistance in series with the second condenser and in parallel with the second relay coil to control the time required for discharge of said second condenser.

7. A traffic analyzing device comprising impulse members arrangeable in spaced relationship in the direction of traffic in a traffic lane on a street, switches actuated by impulses transmitted by said members as a result of cars passing over the same, a source of electrical power, a switch for turning said power on or off, a plurality of timing condensers each arranged in series with said source of power and said on-and-off switch and being therefore chargeable from said source of power when said on-and-off switch is closed, a plurality of relays, each relay having a coil connectable in series with an associated condenser, the first of said relay coils being arranged in series with said source of power and the first of said impulse actuated switches so as to be energized by the passing of a car over said first-mentioned impulse member and the resultant closing of the first of said impulse actuated switches, the second relay coil being arranged in series with said source of power and with the first and second of said impulse actuated switches so as to be energized by the passing of the car over the first and second impulse members and consequent closing of the second as well as the first of said impulse actuated switches within a predetermined time, said impulse members being arrangeable at various distances apart, means, including resistor elements, through which power is supplied from said condensers to their respective relay coils to keep the latter energized for a period determined as to each relay by the time of discharge of its controlling condenser, a car counter actuating coil associated with said first condenser-relay combination and controlled by said first relay whereby the same is energized as a result of energization of the coil of said relay by the passing of the wheels of a car over said first impulse member, a speeding car counter actuating coil associated with said second condenser relay combination and controlled by said second relay whereby the same is energized as a result of energization of the coil of such relay by the passing of the wheels of the car over said second impulse member within a predetermined time after they have passed over said first impulse member.

8. In combination with the structure set forth in claim 7, means, including a plurality of resistance elements and a tap changer, associated with the first-mentioned condenser for varying the time of discharge thereof and thereby determining the rate of speed of a car necessary to cause energization of the coil of the second relay by the passage of the car wheels over said second impulse member before the coil of the first relay is deenergized by discharge of its controlling condenser.

9. A structure as set forth in claim 1, in which the impulse members comprise compressible hollow tubes and the switches actuated thereby are air-operated switches operable by air transmitted through said tubes as a result of the passage of the car wheels over the same.

10. A traffic analyzing device comprising impulse members arrangeable in spaced relationship in the direction of traffic in a traffic lane on a street, switches actuated by impulses transmitted by said members as a result of cars passing over the same, a source of electrical power, a switch for turning said power on or off, a plurality of timing condensers each arranged in series with said source of power and said on-and-off switch and being therefore chargeable from said source of power when said on-and-off switch is closed, a plurality of relays, each relay having a plurality of contacts controlled thereby and having a coil connectable in series with an associated condenser, the first of said relay coils being arranged in series with said source of power and the first of said impulse actuated switches so as to be energized by the passing of a car over said first-mentioned impulse member and the resultant closing of the first of said impulse actuated switches, the second relay coil being arranged in series with said source of power and with the second of said impulse actuated switches and a contact which is closed by the first of said switches so as to be energized by the passing of the car over the first and second impulse members and consequent closing of the second as well as the first of said impulse actuated switches within a predetermined time, said impulse members being arrangeable at various distances apart, means, including resistor elements, through which power is supplied from said condensers to their respective relay coils to keep the latter energized for a period determined as to each relay by the time of discharge of its controlling condenser, means for energizing the second relay coil, including a contact actuated by said first relay and a conductor leading from the second impulse-actuated switch to said contact and from the latter to said second relay coil, whereby the second relay coil is energized by the passing of a car over the second impulse member only if the coil of the first relay has not been previously deenergized by discharge of its controlling condenser, and a signal device controlled by said second relay to indicate as speeding cars those the wheels of which pass over said second impulse member within a predetermined time after passing over said first impulse member.

11. In combination with the structure set forth in claim 10, a calibrating resistance in series with said second condenser for determining the duration of the operation of said signal device.

HAROLD L. McCLEERY.
CARLYLE B. STAIR.

REFERENCES CITED

The following references are of record in the file of this patent:

UNITED STATES PATENTS

| Number | Name | Date |
|---|---|---|
| 1,925,483 | DuBois | Sept. 5, 1933 |
| 1,958,631 | Logan, Jr. | May 15, 1934 |
| 2,019,976 | Huebscher | Nov. 5, 1935 |
| 2,083,264 | Hymans | June 8, 1937 |
| 2,150,776 | Moles | Mar. 14, 1939 |
| 2,161,896 | Cutler | June 13, 1939 |
| 2,181,728 | Greentree | Nov. 28, 1939 |
| 2,186,922 | Hampton et al. | Jan. 9, 1940 |
| 2,267,986 | MacKavanagh | Dec. 30, 1941 |
| 2,284,850 | Smith | June 2, 1942 |
| 2,334,143 | Basquin et al. | Nov. 9, 1943 |
| 2,340,634 | Wiley | Feb. 1, 1944 |
| 2,347,194 | Holliday | Apr. 25, 1944 |

FOREIGN PATENTS

| Number | Country | Date |
|---|---|---|
| 380,585 | Great Britain | Sept. 22, 1932 |